(12) United States Patent
Aoki et al.

(10) Patent No.: US 10,478,919 B2
(45) Date of Patent: Nov. 19, 2019

(54) METHOD FOR PRODUCING ALUMINUM JOINED BODY

(71) Applicant: Kobe Steel, Ltd., Kobe-shi (JP)

(72) Inventors: Takuro Aoki, Fujisawa (JP); Tsuyoshi Matsumoto, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 307 days.

(21) Appl. No.: 15/674,677

(22) Filed: Aug. 11, 2017

(65) Prior Publication Data

US 2018/0071867 A1 Mar. 15, 2018

(30) Foreign Application Priority Data

Sep. 13, 2016 (JP) .................................. 2016-178819

(51) Int. Cl.

| B23K 26/21 | (2014.01) |
|---|---|
| B23K 26/24 | (2014.01) |
| B23K 26/32 | (2014.01) |
| B23K 26/242 | (2014.01) |
| B23K 35/28 | (2006.01) |
| B23K 26/26 | (2014.01) |
| B23K 101/00 | (2006.01) |
| B23K 103/10 | (2006.01) |

(52) U.S. Cl.
CPC ............ *B23K 26/32* (2013.01); *B23K 26/242* (2015.10); *B23K 26/26* (2013.01); *B23K 35/286* (2013.01); *B23K 2101/006* (2018.08); *B23K 2103/10* (2018.08)

(58) Field of Classification Search
CPC .... B23K 26/21–302; B23K 26/32–323; B23K 9/23–232; B23K 35/286
See application file for complete search history.

(56) References Cited

U.S. PATENT DOCUMENTS

| 6,337,147 B1* | 1/2002 | Haszler .................. B23K 9/23 428/654 |
|---|---|---|
| 2010/0129683 A1* | 5/2010 | Lin ......................... B23K 9/23 428/654 |
| 2014/0125090 A1* | 5/2014 | Braunschweig ........ C22C 21/10 296/193.06 |
| 2015/0072170 A1* | 3/2015 | Lin ......................... B23K 9/23 428/654 |
| 2016/0001403 A1* | 1/2016 | Matsumoto ........... B23K 9/232 219/137 R |
| 2016/0114428 A1 | 4/2016 | Wang et al. |
| 2018/0185962 A1* | 7/2018 | Masse .................... B23K 26/22 |

FOREIGN PATENT DOCUMENTS

CN 103451496 A 12/2013

* cited by examiner

*Primary Examiner* — Michael A Laflame, Jr.
(74) *Attorney, Agent, or Firm* — Oblon, McClelland, Maier & Neustadt, L.L.P.

(57) ABSTRACT

A method for producing an aluminum joined body includes a step of forming a flare joint by using a first aluminum member and a second aluminum member; and a step of performing laser welding by irradiating a groove of the flare joint with a laser beam having a beam diameter of 0.8 to 3.5 mm while feeding a filler material to the groove, the filler material being made of an aluminum alloy containing, in percent by mass, 1.0% to 3.0% of Mg, 0.50% to 1.0% of Mn, 0.05% to 0.20% of Cr, and 0.05% to 0.20% of Ti, with the balance being aluminum and incidental impurities.

2 Claims, 4 Drawing Sheets

METHOD FOR PRODUCING ALUMINUM JOINED BODY

BACKGROUND OF THE INVENTION

1. Field of the Invention

The present invention relates to a method for producing an aluminum joined body. More particularly, the invention relates to a method for producing aluminum joined bodies which are used mainly in aluminum structural members, such as roofs and fenders of automobiles.

2. Description of the Related Art

Roof members and the like of automobiles are usually fastened by spot joining. Accordingly, from the aesthetic viewpoint, spot weld marks are generally covered with roof moldings. On the other hand, in order to omit such roof moldings, methods in which a roof member and its adjacent member are continuously joined together by a laser, instead of spot joining, are also under study.

Examples of a filler material that is generally used for welding aluminum materials include Al—Si-based alloys having a high Si content (Al—Si-based alloys specified in JIS 4043 and 4047) and Al—Mg-based alloys having a high Mg content (Al—Mg-based alloys specified in JIS 5356, 5556, and 6183).

Regarding aluminum materials that are used in roofs, doors, fenders, and the like, the thickness is low at about 1 mm, and thermal strain is likely to occur. Consequently, in order to continuously join aluminum materials by using a laser, in addition to proper selection of a filler material, it is necessary to give consideration to the irradiation conditions of a laser beam.

United States Patent Application Publication No. 2016/0114428 discloses a method of welding aluminum materials by using a filler material and dual laser beams, in which irradiation conditions are set for each laser beam.

Regarding aluminum materials (workpieces) used for automotive parts, in order to ensure the strength of the structures, aluminum alloys containing a large amount of Mg, such as Al—Mg-based alloys (5000 series alloys) and Al—Mg—Si-based alloys (6000 series alloys), are used for various purposes. Furthermore, as a filler material for laser welding of these workpieces, Al—Si-based alloys containing a large amount of Si specified in JIS 4047 or JIS 4043 are often suitably used from the viewpoint of fluidity (wettability) of the filler material.

However, in the Al—Si-based alloys specified in JIS 4043 or 4047, there is a limit in reducing heat input for melting the filler material and the workpieces.

On the other hand, by using the Al—Mg-based alloys specified in JIS 5556, JIS 5356, or the like as the filler material, it is possible to reduce energy input (heat input) during laser welding and to improve the strength of the weld joint. However, the filler material having a high Mg content has a drawback in that "smut" made of an oxide coating adheres to the bead surface during laser welding.

The smut needs to be removed because it affects the adhesion of a paint film and the like. However, in the case where the smut penetrates bead irregularities, it is difficult to remove the smut by polishing or the like, or even with a chemical treatment, such as acid pickling or alkaline cleaning, or by wiping with a solvent.

SUMMARY OF THE INVENTION

Accordingly, it is an object of the present invention to provide a production method in which it is possible to obtain an aluminum joined body having high joint strength while suppressing heat input and formation of smut during laser welding.

The object of the present invention can be achieved by the following constructions:

(1) A method for producing an aluminum joined body including a step of forming a flare joint by using a first aluminum member and a second aluminum member; and a step of performing laser welding by irradiating a groove of the flare joint between the first aluminum member and the second aluminum member with a laser beam having a beam diameter of 0.8 to 3.5 mm while feeding a filler material to the groove, the filler material being made of an aluminum alloy containing, in percent by mass, 1.0% to 3.0% of Mg, 0.50% to 1.0% of Mn, 0.05% to 0.20% of Cr, and 0.05% to 0.20% of Ti, with the balance being aluminum and incidental impurities.

(2) The method for producing an aluminum joined body according to the item (1), in which the laser beam has a beam diameter of 2.0 to 3.0 mm.

In the method for producing an aluminum joined body according to the present invention, by performing laser welding by irradiating the groove of the flare joint between the first aluminum member and the second aluminum member with a laser beam having a beam diameter of 0.8 to 3.5 mm while feeding a filler material to the groove, the filler material being made of an aluminum alloy containing, in percent by mass, 1.0% to 3.0% of Mg, 0.50% to 1.0% of Mn, 0.05% to 0.20% of Cr, and 0.05% to 0.20% of Ti, with the balance being aluminum and incidental impurities, it is possible to obtain an aluminum joined body having high joint strength while suppressing heat input and formation of smut during laser welding.

DESCRIPTION OF THE PREFERRED EMBODIMENTS

A method for producing an aluminum joined body according to an embodiment of the present invention will be described below.

Figure 1:
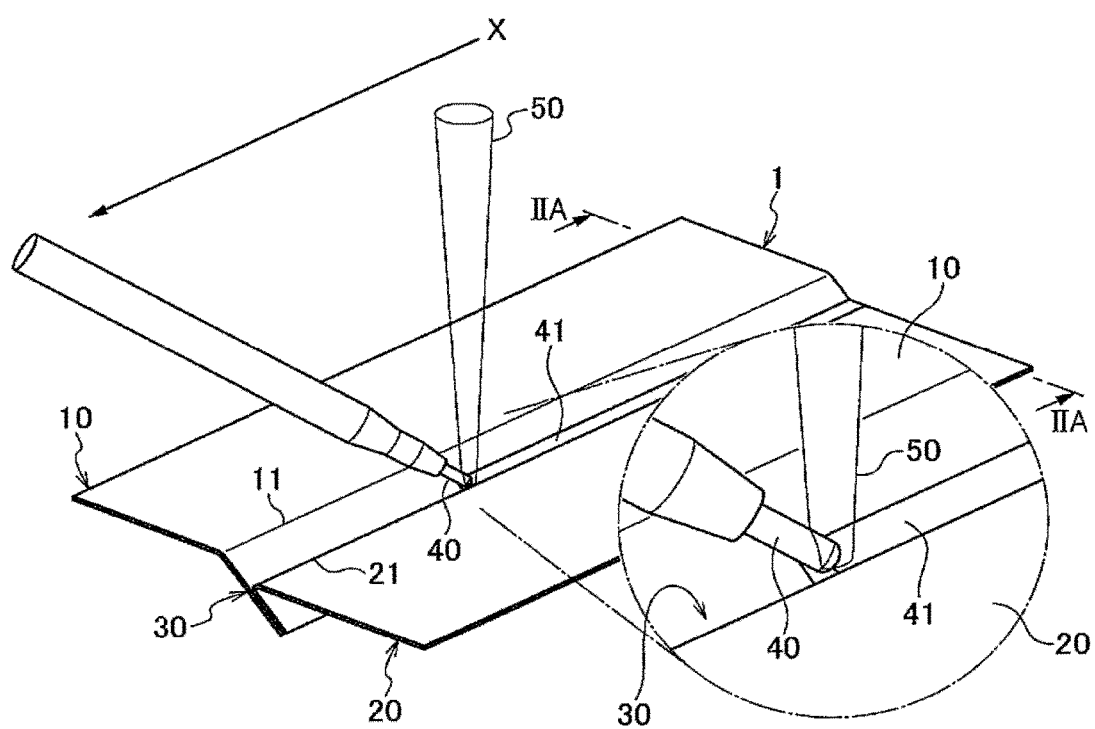
FIG. 1 is a perspective view showing a method for producing an aluminum joined body according to an embodiment of the present invention along with an enlarged view of a principal part.
Figure 2A:
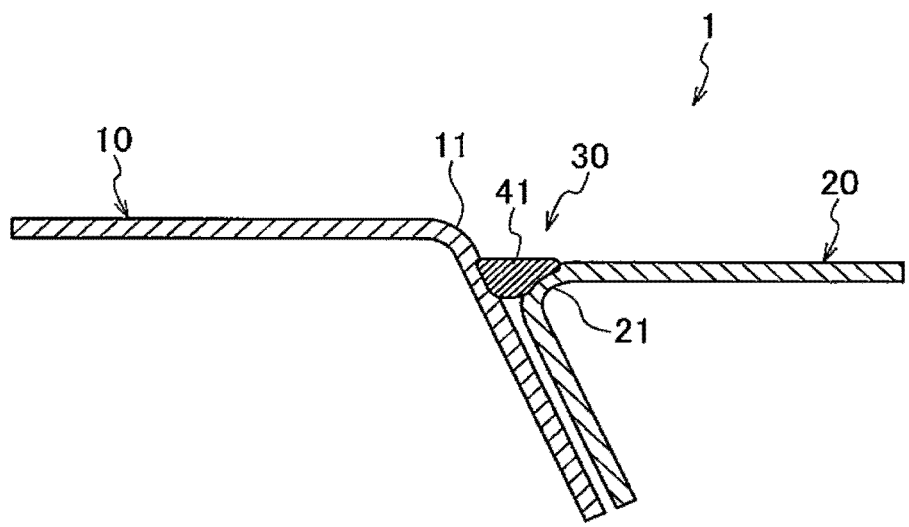
FIG. 2A is a cross-sectional view, which is taken along the line IIA-IIA of FIG. 1, illustrating a flare joint of the present invention.

In this embodiment, as shown in FIGS. 1 and 2A, a flare joint is formed by using a bent portion 11 of a first aluminum member (hereinafter, may be also referred to as the "first member") 10 and a bent portion 21 of a second aluminum member (hereinafter, may be also referred to as the "second member") 20. A joining portion (weld joint) 30 is formed by irradiating a groove of the flare joint with a laser beam 50 while feeding a filler material 40 to the groove, the filler material 40 being made of an aluminum alloy which will be described below. Thereby, an aluminum joined body 1 is produced. In FIGS. 1 and 2A, a reference sign 41 denotes a bead, and a reference sign X denotes a welding direction.

Note that, the term "flare joint" refers to a joint having a groove shape consisting of circular arcs or a circular arc and a straight line of members to be welded. The aluminum joined body 1 constituting a flare joint to which the production method of the present invention is applied is not limited to the one shown in FIG. 2A. For example, the flare joint may have a cross-sectional shape such as a shape shown in FIGS. 2B to 2D.

Figure 2B:
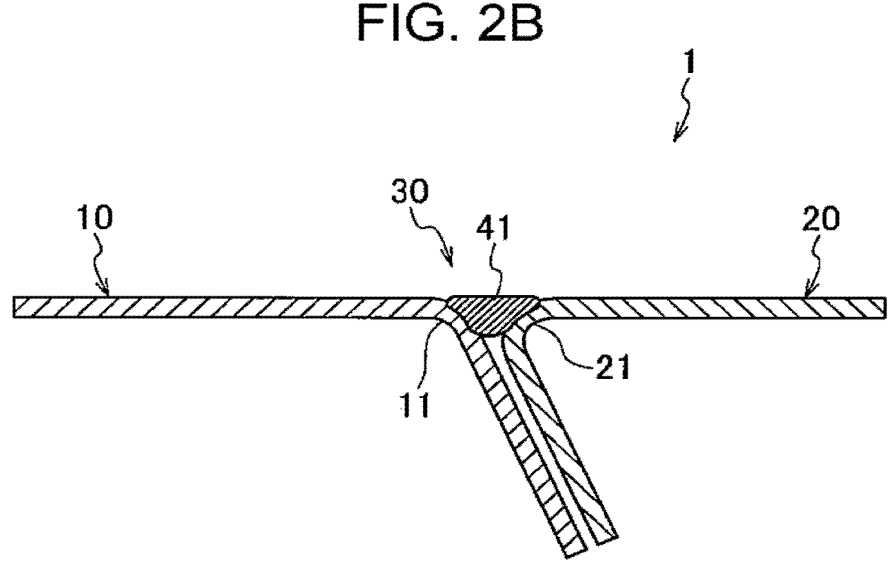
FIG. 2B is a cross-sectional view, which corresponds to FIG. 2A, illustrating a flare joint different from that shown in FIG. 2A.
Figure 2C:
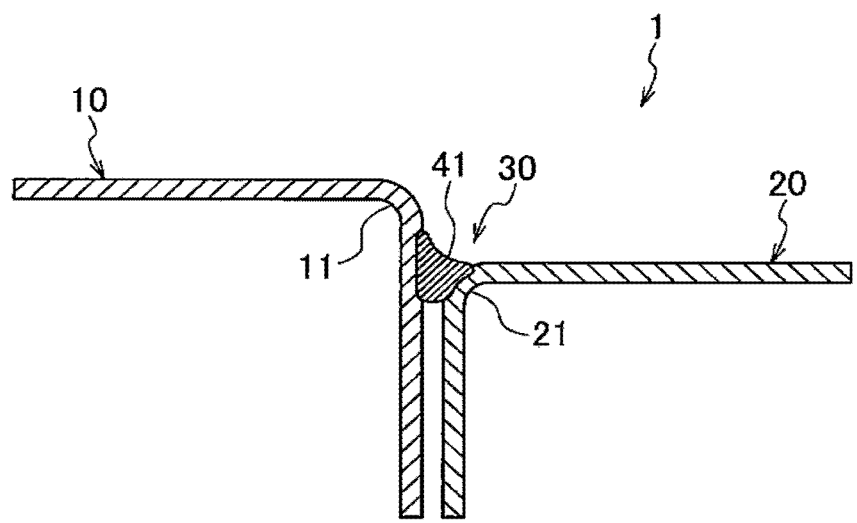
FIG. 2C is a cross-sectional view, which corresponds to FIG. 2A, illustrating a flare joint different from that shown in FIG. 2A.
Figure 2D:
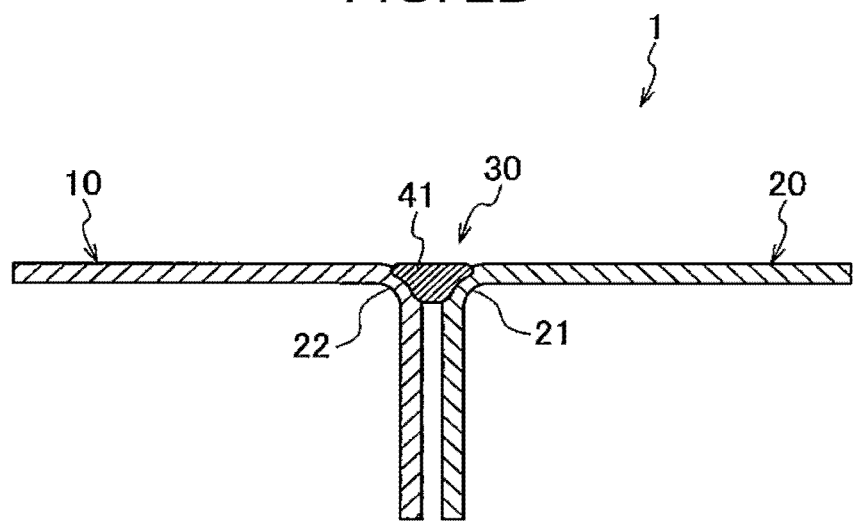
FIG. 2D is a cross-sectional view, which corresponds to FIG. 2A, illustrating a flare joint different from that shown in FIG. 2A.

For example, as shown in FIGS. 2A and 2B, the joining portion 30 may be formed such that the bent portion 11 of the first member 10 is obtuse-angled and the bent portion 21 of the second member 20 is acute-angled, or as shown in FIGS. 2C and 2D, the joining portion 30 may be formed such that each of the bent portions 11 and 21 is right-angled.

Furthermore, in the joining portion 30, as shown in FIGS. 2A and 2C, there may be a difference in level between the first member 10 and the second member 20, or as shown in FIGS. 2B and 2D, there may be no difference in level.

The first and second aluminum members 10 and 20, properties of components of the filler material 40, and the beam diameter of the laser beam that are applied to this embodiment will be described below in this order.

<First and Second Aluminum Members>

1000 to 8000 series aluminum or aluminum alloys can be applied to each of the first and second aluminum members 10 and 20. In particular, from the viewpoint of strength, 5000 series, 6000 series, and 7000 series aluminum or aluminum alloys can be suitably used for the first and second aluminum members 10 and 20. The first and second aluminum members 10 and 20 may be single-layered, but also may have a structure provided with a cladding layer composed of aluminum (Al—Si-based alloy).

<Filler Material made of Aluminum Alloy>

The filler material 40 made of an aluminum alloy includes, in percent by mass, 1.0% to 3.0% of Mg, 0.50% to 1.0% of Mn, 0.05% to 0.20% of Cr, and 0.05% to 0.20% of Ti, with the balance being aluminum and incidental impurities. The percent by mass is relative to the whole mass of the filler material. The percent by mass for each of the elements is specified for the reasons described below.

<Mg>

Mg contributes to improving the strength of the joining portion 30. Furthermore, since Mg evaporates at a relatively low temperature, the depth of penetration can be increased by a low heat input.

When the Mg content is less than 1.0%, a predetermined joint strength cannot be obtained, and the heat input required for formation of the weld bead 41 increases. Furthermore, a drawback in which a wire, i.e., the filler material 40, becomes buckled while being fed tends to occur. On the other hand, when the Mg content exceeds 3.0%, an oxide (smut) is likely to be produced by heat during welding. Therefore, the Mg content is set to be 1.0% to 3.0%.

<Mn>

Mn is an element that contributes to improving the strength of the joining portion 30 as in Mg. When the Mn content is decreased in order to suppress the amount of the oxide coating formed, the joint strength of the joining portion 30 decreases. Accordingly, by incorporating a predetermined amount of Mn, it is possible to maintain a required joint strength.

From the viewpoint of reduction of heat input and maintenance of joint strength, the Mn content is set to be 0.50% to 1.0%. When the Mn content is less than 0.50%, joint strength becomes insufficient. On the other hand, even when Mn is incorporated in an amount exceeding 1.0%, the effect of improving joint strength becomes saturated and is diminished. Therefore, the Mn content is set to be 0.50% to 1.0%.

<Cr, Ti>

Cr and Ti each contribute to refining the metal structure of the weld bead 41 and prevent cracking of the weld bead 41.

When each of the Cr content and the Ti content is less than 0.05%, the structure refining effect cannot be obtained sufficiently. On the other hand, even when each of the Cr content and the Ti content is increased to more than 0.20%, the structure refining effect becomes saturated. Therefore, each of the Cr content and the Ti content is set to be 0.05% to 0.20%.

<Incidental Impurities>

Impurities can be incorporated into the filler material 40 within the range that does not impair the advantages of the present invention. Regarding impurity species, the filler material 40 can contain 0.25% or less of Si, 0.40% or less of Fe, 0.10% or less of Cu, 0.25% or less of Zn or less, and 0.15% or less of other elements in total (0.05% or less of each element).

Furthermore, the diameter of a wire, i.e., the filler material 40, can be appropriately selected within a range of 0.8 to 2.0 mm depending on the shape of the joining portion 30 and other welding conditions.

<Beam Diameter of Laser Beam>

The beam diameter of the laser beam 50 at the groove of the flare joint is set to be 0.8 to 3.5 mm. When the beam diameter is decreased, with the laser output being fixed, the depth of penetration increases because of an increased energy density. When the beam diameter is decreased to less than 0.8 mm, in the case of workpieces with a small thickness of 0.8 to 1.5 mm that are used for roofs of automobiles or the like, the beam easily passes through the workpieces, which is a problem. On the other hand, when the beam diameter of the laser beam 50 at the groove of the flare joint is increased to more than 3.5 mm, the heat input increases because irradiation with the beam is performed over a wide area.

Therefore, the beam diameter of the laser beam 50 at the groove of the flare joint is set to be 0.8 to 3.5 mm, and is preferably set to be 2.0 to 3.0 mm. In such a manner, it is possible to enhance the balance between heat input and joint strength.

Note that the energy density (I: $W/mm^2$) is expressed by a value obtained by dividing the laser output (P: W) by the beam area (A=beam diameter$\times\pi/4$: $mm^2$), as shown by the following formula:

$$I = P/A = P/\pi r^2 \quad (r = \text{beam diameter}/2)$$

The energy density is a parameter that influences the depth of penetration in the laser weld portion and the bead appearance. That is, when the energy density is large (i.e., the beam area is small, or the laser output is high), the depth of penetration increases and the bead appearance degrades. Furthermore, when the energy density is small (i.e., the beam area is large, or the laser output is low), shallow penetration or light reflection without melting makes the bead appearance good.

Furthermore, the beam diameter of the laser beam 50 is appropriately selected within a range of 0.8 to 3.5 mm depending on the width of the weld bead 41.

For example, when the beam diameter exceeds 3.5 mm, melting does not occur unless the heat input is increased, and as a result, a high laser output is required. Therefore, there is a possibility that the width of the weld bead 41 may be increased, and portions not required to be joined, i.e., portions of base metals located over the upper surface of the weld bead 41 and not related to joining may be melted, resulting in a decrease in strength and a large thermal strain under the influence of heat.

The beam irradiation in the laser beam welding may be of "keyhole" type, or defocused beam irradiation may be performed in which the focal point of the beam is shifted in the thickness direction of the workpiece.

As the laser beam 50, various types of laser, such as fiber laser, disc laser, semiconductor laser, YAG laser, and $CO_2$ laser, can be used.

As described above, the production method according to this embodiment includes a step of forming a flare joint by using a first aluminum member 10 and a second aluminum member 20; and a step of performing laser welding by irradiating a groove of the flare joint between the first aluminum member 10 and the second aluminum member 20 with a laser beam 50 having a beam diameter of 0.8 to 3.5 mm while feeding a filler material 40 to the groove, the filler material 40 being made of an aluminum alloy containing, in percent by mass, 1.0% to 3.0% of Mg, 0.50% to 1.0% of Mn, 0.05% to 0.20% of Cr, and 0.05% to 0.20% of Ti, with the balance being aluminum and incidental impurities. Thereby, it is possible to obtain an aluminum joined body 1 having high joint strength and beautiful bead appearance while suppressing heat input and formation of smut during laser welding and decreasing thermal strain.

It is to be understood that the present invention is not limited to the embodiments described above, and modifications and improvements can be appropriately made within a range not deviating from the gist of the present invention.

EXAMPLES

A plurality of joined test pieces (Examples 1 to 3 and Comparative Examples 1 to 6) were produced, and regarding each of the joined test pieces, the bead appearance, joint strength, and heat input were evaluated, as will be described later.

<Production of Joined Test Pieces>

A member made of an aluminum alloy corresponding to an Al—Mg—Si-based alloy specified in JIS 6022, with a width of 100 mm and a thickness of 1.2 mm, was used for each of the first and second aluminum members 10 and 20. By using the bent portion 11 of the first aluminum member 10 and the bent portion 21 of the second aluminum member 20, a flare joint was formed as shown in FIGS. 1 and 2A.

Then, while feeding a filler material 40 (solid wire) to a groove (weld seam) of the flare joint, a weld bead 41 was formed by laser welding with the first and second aluminum members 10 and 20 and the filler material 40 being melted. Thus, a joining portion 30 was obtained. The laser welding conditions were as described below.

(Test Conditions)

Laser welding machine: Fiber laser manufactured by IPG Corp. (YLS-6000)

Laser beam travel speed (=joining speed): 3.0 m/min

Beam diameter of laser beam: Refer to Examples 1 to 3 and Comparative Examples 1 to 6 in Table 1.

Laser beam output: Adjusted within a range of 3 to 8 kW in accordance with the beam diameter such that a certain energy density was obtained.

Composition of filler material: Refer to Examples 1 to 3 and Comparative Examples 1 to 6 in Table 1.

Feeding rate of filler material wire: 4.0 m/min

Diameter of filler material wire: 1.6 mm

TABLE 1

|  | Composition of filler material (mass %) | | | | | | Beam diameter (mm) |
| --- | --- | --- | --- | --- | --- | --- | --- |
|  | Mg | Mn | Cr | Ti | Balance | Remark |  |
| Example 1 | 2.7 | 0.7 | 0.10 | 0.10 | Al + impurities |  | 2.5 |
| Example 2 | 1.2 | 0.7 | 0.10 | 0.10 | Al + impurities |  | 2.0 |
| Example 3 | 2.0 | 0.7 | 0.10 | 0.10 | Al + impurities |  | 3.0 |
| Comparative Example 1 | 4.5 | 0.5 | 0.10 | 0.10 | Al + impurities |  | 2.5 |
| Comparative Example 2 | — | — | — | — | Al + impurities | corresponding to JIS4047 | 2.5 |
| Comparative Example 3 | 4.7 | 0.2 | 0.10 | 0.10 | Al + impurities |  | 2.5 |
| Comparative Example 4 | 2.5 | 0.3 | 0.10 | 0.10 | Al + impurities |  | 2.5 |
| Comparative Example 5 | 2.8 | 0.8 | 0.10 | 0.10 | Al + impurities |  | 0.6 |
| Comparative Example 6 | 2.8 | 0.8 | 0.10 | 0.10 | Al + impurities |  | 4.0 |

Regarding Examples 1 to 3 and Comparative Examples 1 to 6 thus obtained, the bead appearance, joint strength, and heat input were evaluated as will be described below. The results thereof are shown in Table 2.

<Bead Appearance>

The appearance of each of the joined test pieces after welding was visually observed. The joined test piece having no smut (i.e., having no discolored portion) was evaluated to be good (○), and the joined test piece having a discolored portion was evaluated to be poor (×).

<Joint Strength>

The joint strength was evaluated by cutting each of the joined bodies to a width of 10 mm and pulling it with a tensile tester. The joined body that was broken at the base metal was evaluated to be good (○), and the joined body that was broken at the bead was evaluated to be poor (×).

<Heat Input>

The heat input was evaluated on the basis of the set output of the welding machine at which a certain weld bead size (depth of penetration) could be obtained. A heat input of 4.0 kW or less was evaluated to be good (⊙), a heat input of more than 4.0 kW and 4.5 kW or less was evaluated to be average (○), and a heat input of more than 4.5 kW was evaluated to be poor (×).

TABLE 2

|  | Bead appearance | Joint strength | Heat input |
|---|---|---|---|
| Example 1 | ○ | ○ | ⊙ |
| Example 2 | ○ | ○ | ○ |
| Example 3 | ○ | ○ | ○ |
| Comparative Example 1 | × | × | ⊙ |
| Comparative Example 2 | ○ | ○ | × |
| Comparative Example 3 | × | ○ | ⊙ |
| Comparative Example 4 | ○ | × | ○ |
| Comparative Example 5 | × | ○ | ○ |
| Comparative Example 6 | ○ | ○ | × |

Figure 3A:
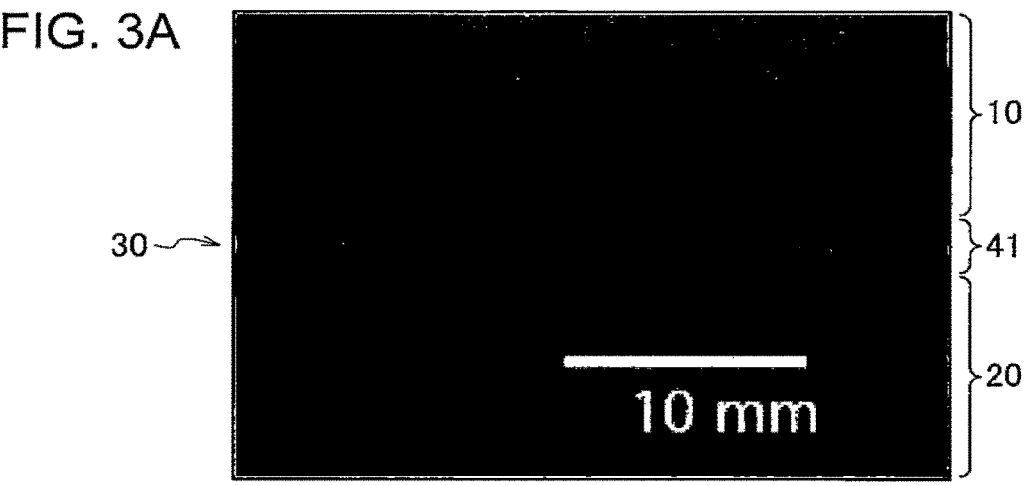
FIG. 3A is a photograph showing a plan view of a weld bead portion according to Example 1.

The test results for Examples 1 to 3 and Comparative Examples 1 to 6 will be described below. FIG. 3A is a photograph showing an enlarged plan view of a weld bead portion in Example 1, FIG. 3B is a photograph showing an enlarged plan view of a weld bead portion in Comparative Example 2, and FIG. 3C is a photograph showing an enlarged plan view of a weld bead portion in Comparative Example 3.

In Comparative Example 1, although the heat input is good, since the Mg content in the filler material 40 is high at 4.5%, a large amount of smut S is formed, resulting in poor appearance. Furthermore, the joint strength is also poor.

Figure 3B:
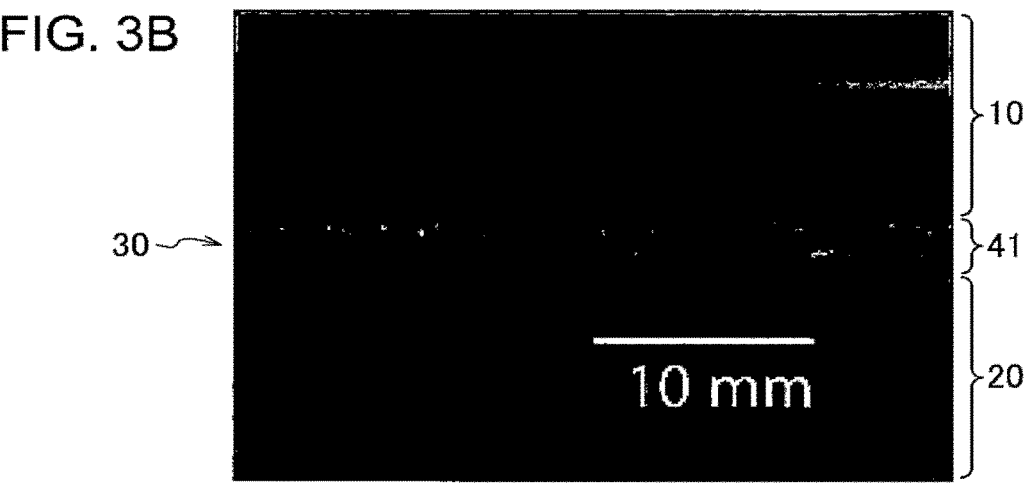
FIG. 3B is a photograph showing a plan view of a weld bead portion according to Comparative Example 2.
Figure 3C:
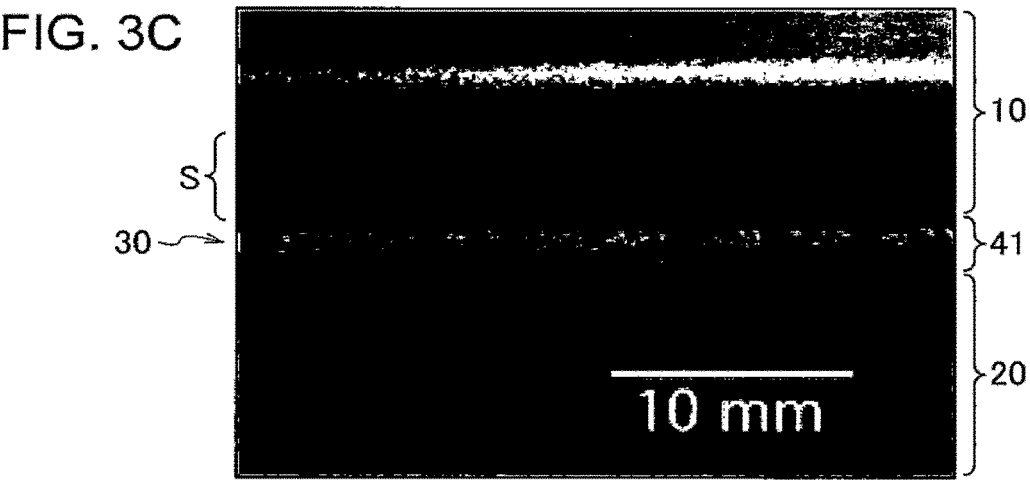
FIG. 3C is a photograph showing a plan view of a weld bead portion according to Comparative Example 3.

In Comparative Example 2, as shown in FIG. 3B, the bead appearance is good, and the joint strength is also good. However, since the filler material 40 does not contain Mg, the heat input is increased and evaluated to be poor.

In Comparative Example 3, the joint strength and the heat input are good. However, since the Mg content in the filler material is high at 4.7%, as shown in FIG. 3C, a large amount of smut S is formed, resulting in poor appearance.

In Comparative Example 4, the bead appearance is good, and the heat input is average. However, since the Mn content in the filler material is low at 0.3%, the joint strength is poor.

In Comparative Example 5, although the contents of Mg, Mn, Cr, and Ti in the filler material are within the ranges of the present invention, the laser beam diameter is small. In this case, the joint strength is good, and the heat input is average. However, the bead appearance is poor.

In Comparative Example 6, although the contents of Mg, Mn, Cr, and Ti in the filler material are within the ranges of the present invention, the laser beam diameter is large. In this case, the bead appearance and the joint strength are both good. However, the heat input is significantly poor.

In contrast, as shown in Tables 1 and 2, in Examples 1 to 3 in which the contents of Mg, Mn, Cr, and Ti in the filler material and the laser beam diameter are within the ranges of the present invention, the bead appearance and the joint strength are both good, and the heat input is good or within an acceptable range.

What is claimed is:

1. A method for producing an aluminum joined body comprising:
    a step of forming a flare joint by using a first aluminum member and a second aluminum member; and
    a step of performing laser welding by irradiating a groove of the flare joint between the first aluminum member and the second aluminum member with a laser beam having a beam diameter of 0.8 to 3.5 mm while feeding a filler material to the groove, the filler material being made of an aluminum alloy containing, in percent by mass, 1.0% to 3.0% of Mg, 0.50% to 1.0% of Mn, 0.05% to 0.20% of Cr, and 0.05% to 0.20% of Ti, with the balance being aluminum and incidental impurities.

2. The method for producing an aluminum joined body according to claim 1, wherein the laser beam has a beam diameter of 2.0 to 3.0 mm.

* * * * *